(12) United States Patent
Wilson et al.

(10) Patent No.: US 9,900,329 B2
(45) Date of Patent: Feb. 20, 2018

(54) COMPUTER-IMPLEMENTED SYSTEM AND METHOD FOR DISCOVERING HETEROGENEOUS COMMUNITIES WITH SHARED ANOMALOUS COMPONENTS

(71) Applicant: Palo Alto Research Center Incorporated, Palo Alto, CA (US)

(72) Inventors: Aaron Creighton Wilson, East Palo Alto, CA (US); Juan Liu, Milpitas, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 108 days.

(21) Appl. No.: 14/848,181

(22) Filed: Sep. 8, 2015

(65) Prior Publication Data
US 2017/0070519 A1    Mar. 9, 2017

(51) Int. Cl.
*H04L 29/06*   (2006.01)
*G06F 17/30*   (2006.01)

(52) U.S. Cl.
CPC ...... *H04L 63/1425* (2013.01); *G06F 17/3053* (2013.01); *G06F 17/30696* (2013.01); *G06F 17/30705* (2013.01); *G06F 17/30958* (2013.01)

(58) Field of Classification Search
CPC ............. H04L 63/1425; G06F 17/3053; G06F 17/30705; G06F 17/30958
See application file for complete search history.

(56) References Cited

U.S. PATENT DOCUMENTS 7,739,313 B2    6/2010   Mishra
7,884,434 B2    11/2010  Hildrum
8,336,855 B2    12/2012  Aggarwal

OTHER PUBLICATIONS

Ofer Mendelelvitch—NPL Mar. 2015 (2 parts);obtained from hortonworks.com on Feb. 20, 2017.*
Liu et al. NPL 2009—Topic-Link LDA.*
Xiong, Liang, Barnabás Póczos, Jeff Schneider, Andrew Connolly, and Jake VanderPlas. "Hierarchical probabilistic models for group anomaly detection." Artificial Intelligence and Statistics Conference (2011): 789-797.

(Continued)

*Primary Examiner* — Tri Tran
(74) *Attorney, Agent, or Firm* — Patrick J. S. Inouye; Leonid Kisselev

(57) ABSTRACT

A computer-implemented system and method for discovering heterogeneous communities with shared anomalous components is provided. A graph is obtained that includes vertices representing entities that are connected by edges representing associated with the entities represented by the connected vertices. The vertices are associated with collections of words of different categories, each of the words describing an item associated with at least one of the events. Each of the vertices is further associated with topics describing a type of activity of the entity represented by that vertex. Communities within the graph are identified, each including at least two of the connected vertices. Identified as anomalous are categories of words whose removal from the collections associated with the vertices in a community increases a likelihood of that community being associated and the collections of the words associated with the community vertices.

20 Claims, 7 Drawing Sheets

(56) References Cited

OTHER PUBLICATIONS

Blei, David M., Andrew Y. Ng, and Michael I. Jordan. "Latent dirichlet allocation." the Journal of machine Learning research 3 (2003): 993-1022.
Zhang, Haizheng, Ke Ke, Wei Li, and Xuerui Wang. "Graphical models based hierarchical probabilistic community discovery in large-scale social networks." International Journal of Data Mining, Modelling and Management 2, No. 2 (2010): 95-116.
Mørup, Morten, and Mikkel N. Schmidt. "Bayesian community detection." Neural computation 24.9 (2012): 2434-2456.
Henderson, Keith, and Tina Eliassi-Rad. "Applying latent dirichlet allocation to group discovery in large graphs." Proceedings of the 2009 ACM symposium on Applied Computing. ACM, 2009: 1456-1461.
Liu, Yan, Alexandru Niculescu-Mizil, and Wojciech Gryc. "Topic-link LDA: joint models of topic and author community." Proceedings of the 26th annual international conference on machine learning. ACM, 2009.

* cited by examiner

COMPUTER-IMPLEMENTED SYSTEM AND METHOD FOR DISCOVERING HETEROGENEOUS COMMUNITIES WITH SHARED ANOMALOUS COMPONENTS

FIELD

This application relates in general to analyzing heterogeneous groups, and in particular to a computer-implemented system and method for discovering heterogeneous communities with anomalous components.

BACKGROUND

Detecting anomalous behavior, behavior that a person or organization of a certain type is not supposed to exhibit, can be a first step towards stopping potentially criminal activities. While such behavior may be easy to recognize by closely watching an individual whose normal pattern of behavior is known, such monitoring becomes impractical, either by humans or using computer-implemented technology, when a group of people or organizations is involved, especially as the number of people whose behavior needs to be monitored grows and their normal behavior is not apriori known. For example, health care providers have a variety of specializations, and their normal behavior in prescribing treatments and medicines, including the kind and number of each particular medicine, differs depending on their specialization. Thus, a cardiologists generally prescribes a high proportion of cardiac medications while an oncologist generally prescribes a high percentage of chemotherapy drugs. While, despite the differences in specialties, these health care providers may share an anomalous behavior, such as prescribing a high amount of painkillers or other narcotics, without initially knowing their normal prescription pattern, detecting their anomalous prescriptions becomes a challenge.

Current technologies do not allow to efficiently recognize the anomalous behaviors in a community with multiple members. For example, U.S. Pat. No. 8,336,855, to Aggarwal et al., issued Dec. 25, 2012, discloses a way to identify communities in an information network, such as a social network, by identifying one or more nodes and edges in the network, identifying a sequence of one or more nodes using a random walk on the one or more nodes, and mining the sequence to determine patterns in the network. While allowing the identification of communities in the network, the Aggarwal work does not address how to recognize anomalous behaviors in these communities.

Similarly, U.S. Pat. No. 7,739,313, to Mishra et al., issued Jun. 15, 2010, describes a method and system for finding a conjunctive group. Two groups of points are identified and a first sample of a predetermined size is drawn from the first group. Subsets are identified within the first sample and a subgroup of the second group of points that share an intersection with all of the points in the first sample is identified. Subsequently, a subgroup of the first group of points that share an intersection with a specified number of the points in the subgroup of the second group of points are identified. Finally, a third group of points that represents a conjunctive cluster is output, with the product of the magnitude of the subgroup of the second group and the magnitude of the subgroup of the first group being maximized. While describing how to find conjunctive clusters, Mishra fails to address how to recognize anomalous behaviors in these communities.

Likewise, U.S. Pat. No. 7,884,434, to Hildrum et al., issued Nov. 30, 2010, describes a way to perform focused community discovery in a network. In particular, Hildrum describes a way to discover a community in a given entity in an interaction graph, with nodes representing entities in the graph and representing interactions between the connected nodes. The nodes are partitioned into different sets based on the interaction information to minimize the numbers of interaction pairs that need to be considered. Entities are moved between the different sets such that the community is discovered once a measure associated with an objective function is minimized. While describing how to discover communities, Hildrum fails to address how to recognize anomalous behaviors in these communities.

Therefore, there is a need for a computer-implemented system and method for discovering heterogeneous communities with anomalous components.

SUMMARY

The system and method described below allow to automatically simultaneously discover typical characteristics of an entity, such as an organization or an individual, such as conducting by that entity a certain type of business, and to simultaneously detect when the behavior of that entity becomes anomalous. The anomalous activity can be effectively visualized to allow easy detection by an analyst. Thus, the system and method provide a concrete technological solution to the practical problem of detecting anomalous activity among a large number of entities whose normal behavior pattern is initially unknown.

An embodiment provides a computer-implemented system and method for discovering heterogeneous communities with shared anomalous components. A graph is obtained that includes a plurality of vertices, each of the vertices representing an entity and being connected to at least one of the remaining vertices by an edge representing one or more events associated with the entities represented by the connected vertices. Each of the vertices is associated with a collection of words of one or more categories, with each of the words describing an item associated with at least one of the events associated with that vertex. Each of the vertices is further associated with one or more topics that describe a type of and an activity of the entity represented by that vertex. One or more communities within the graph are identified, each of the communities including at least two of the connected vertices. For one or more of the communities are identified one or more of the categories of the words whose removal from the collections associated with the vertices in that community increases a likelihood of that community being associated with the collections of the words associated with the vertices in that community. One or more of the identified word categories are set as anomalous for the communities for which the word categories were identified.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention.

Accordingly, the drawings and detailed description are to be regarded as illustrative in nature and not as restrictive.

DETAILED DESCRIPTION

The system and method described below allow to effectively and efficiently identify anomalous behavior among a large number of entities. While the system and method described below use examples of healthcare providers and pharmacies, the system and method can be used in other industries as well, allowing technologically efficient and effective discovery of anomalous communities.

Figure 1:
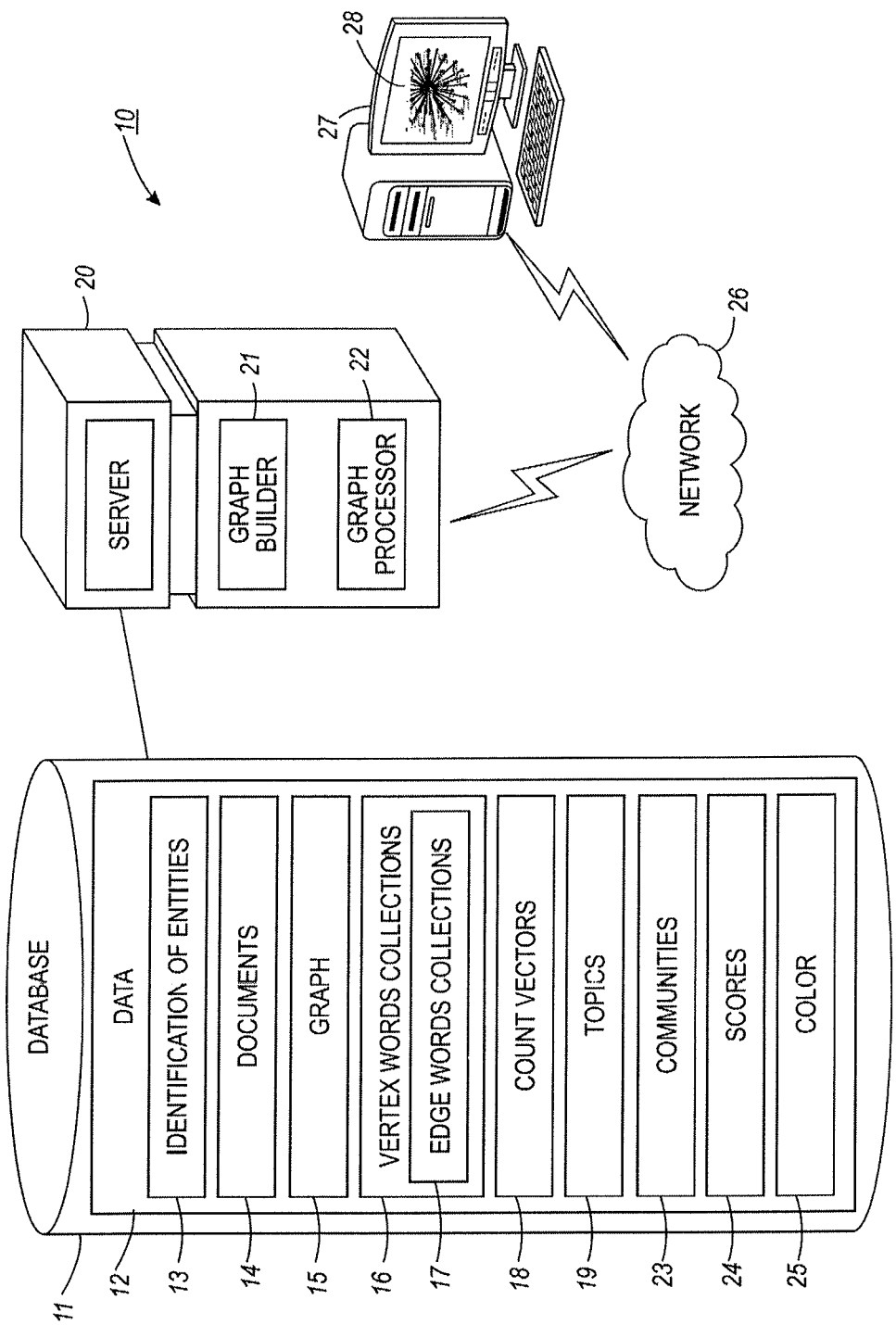
FIG. 1 is a block diagram showing a computer-implemented system for discovering heterogeneous communities with anomalous components in accordance with one embodiment.

FIG. 1 is a block diagram showing a computer-implemented system 10 for discovering heterogeneous communities with anomalous components in accordance with one embodiment. The system 10 includes a database 11 that stores data 12 associated with a plurality of entities, such as individuals or organizations. At least some of the entities have connections to each other. The data 12 includes the identifications 13 of such entities, such as a name of a health care provider or a name of a pharmacy to which the health care provider makes prescriptions. Associated with each of the entities is one or more documents 14 that include information about how the entities are interconnected to each other. For example, each document 14 can include one or more medical claims that include information about the prescriptions that a particular health care provider made to a particular pharmacy, including the information about the number of times the prescription is prescribed. The claims can further include information regarding the reimbursed sales that were made based on the prescriptions.

The database can further store a graph 15 that represents the entities and the connections between the entities. The graph 15, denoted as G=(V,E) is a collection of vertices V connected by a set of edges E. The vertices in the graph 15 represent the entities identified in the database 11. Each of the edges represents one or more events associated with both entities represented by the vertices connected by the edge. Thus, in the healthcare example, each of the vertices can represent one of a healthcare provider and a pharmacy to which the healthcare provider made prescriptions for a patient and the edge can represent a prescription event, a prescription of a certain medicine to the patient made to the pharmacy. Other kinds of vertices are possible. For example, in a further embodiment, a patient to whom a prescription is made can be represented by one of the vertices. Still other kind of vertices and edges are possible. Each of the vertices is of a latent type, meaning that while the identifications 13 of the entity associated with the vertex is known, the type of activity, such as a business, in which the entity engages in, is unknown before further analysis is performed.

Each of the vertices is associated with a collection 16 of words $w_v = (w_1, w_2, w_3, \ldots, w_N)$ where each $w_i$ is a word belonging to a fixed vocabulary with K word types ("vertex word"). Each of the words describes an item associated with one of the events represented by an edge connected to that vertex. Each of the words also belongs to a particular category (also referred to as "word type" or "type of words" in the description below). For example, each of the words can be a prescribed drug belonging to a category, or type, such as a category defined by the Hierarchical Ingredient Code List ("HICL"), such as a drug whose active ingredient includes codeine or hydrocodone. Other classifications are possible. For example, a drug can be classified by function, such as a drug whose function is to act as a blood sugar diagnostics. Drugs about which not enough information is available can be grouped into an "unknown" classification. Other kinds of classifications are possible. The collection 16 of vertex words associated with each of the vertices decomposes into a collections 17 of words associated with each of the edges connected to that vertex such that the collection of edge words $w_e = (w_{e1}, w_{e2}, w_{e3}, \ldots, w_{eN})$. The edges E are a set of undirected edges connecting the vertices such that $e_{i,j} = (v_i, v_j)$ where $e_{i,j} \in E$. Further, $\forall v_i, w_v = \cup w_{e_{ij}} : i \neq j$. Thus, the collection 16 of words $w_v$ that is associated with each of the vertices is the union of the collections 17 of the words $w_e$ associated with the edges connected to those vertices. In the sentences above, the letter E refers a set of all of all edges in the graph 15, while e represents one of the edges. Similarly, V represents a set of all of the vertices in the graph 15 while v represents one of the vertices.

In a further embodiment, each of the words can describe an action associated with one of the events represented by an edge connected to the vertex associated with that word. For example, if a prescription event represented by an edge describes a prescribed procedure, the word can describe the procedure that was prescribed. Still other kinds of edges associated with the vertices are possible.

Each word is further associated with count vectors 18 that store numerical metrics associated with the vertices and the edges. For example, the count vector 18 for a vertex representing a health care provider can store the amount of the reimbursed sales for each vertices associated words, for example for each prescribed drug. Other kinds of numerical metrics are possible. For example, the count can specify the number of times each of the types of words is exchanged between the vertices (which, in the healthcare example, would be the number of times each of types of drugs is prescribed by a health care provider to a pharmacy).

The words in the collection 16 associated with each of the vertices are also associated with one or more topics 19. These topics 19 describe the type of activities conducted by the entities represented by the vertices and are thus associated with one or more of the vertices. Such activities can be a kind of business conducted by the entity, though other kinds of activities are possible. The topics 19 can be indexed and identified by the index associated with the topic 19. Each of the topics 19 is a word proportion vector that are associated with the topic, as further described with reference to FIG. 3. In the healthcare example, each of the topics 19 can identify a kind of patients treated by a health care provider, such as patients with a particular type of cancer. The words associated with the topics 19 identify the type of drugs that the provider used to treat the patients.

As mentioned above, initially, the topics 19 associated with each of the vertices are initially unknown. The topics can be discovered by one or more servers 20 operatively coupled to the database 11, such as by a graph processor 22 executed by the servers 20, as further described with reference to FIG. 3.

The graph 15 can be built based on the data 12 in the database 11 by the one or more servers 20 executing a graph builder 21. For example, as described above, in the medical context vertices correspond to healthcare providers and pharmacies. The set of the vertices for the graph by scanning the contents of the documents 14, gathering the list of providers, the pharmacies, and the list of drugs for which they were the prescriber. The edge set is constructed from the set of vertices by constructing an edge $e_{i,j}=(v_i, v_j)$ when vertices i and j are connected by a prescription event. Other ways of building the graph 15 are possible. In a further embodiment, the graph 15 can be obtained from another source.

The topics 19 and the words in the collections 16 associated with each of the vertices allow to identify anomalous behavior among the entities represented by the vertices, behavior that is not consistent with the type of activity these entities normally engage in. Thus, for instance, a cardiologist and an oncologist may be interacting with a pharmacy to sell narcotics to addicted beneficiaries. While the majority of their behaviors are consistent with their type of practice, composed of heart disease and chemotherapy drugs respectively, the narcotics sales represent a shared deviation from their respective businesses. Moreover, by interacting with the same pharmacy these two individuals are part of a group that sells narcotics.

Figure 2:
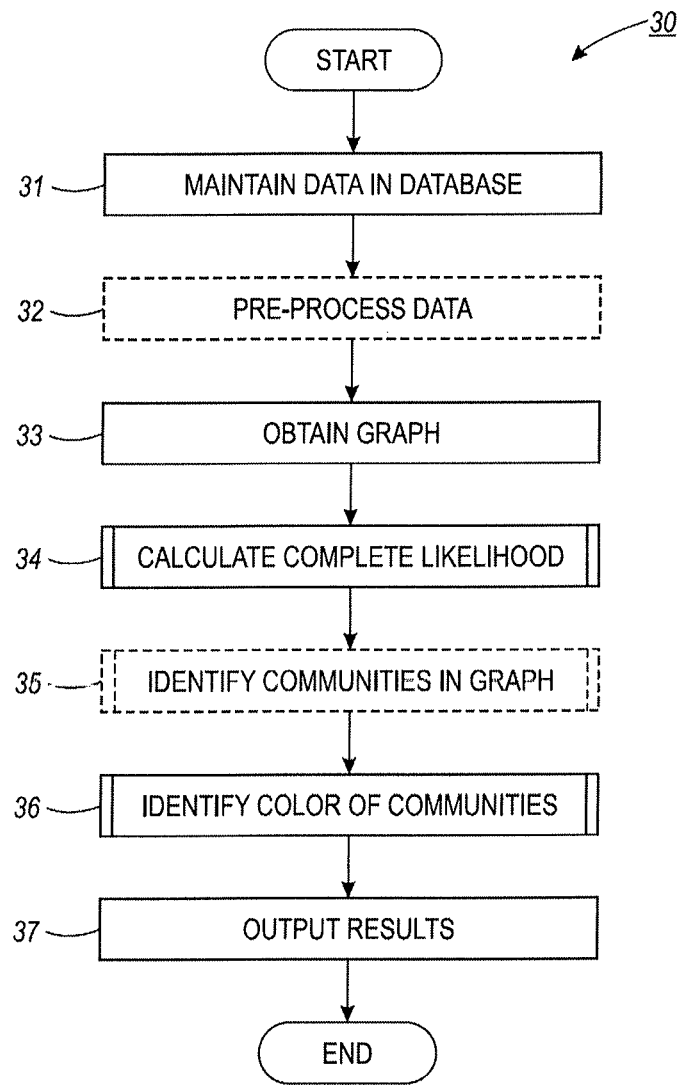
FIG. 2 is a flow diagram showing a computer-implemented method for discovering heterogeneous communities with anomalous components in accordance with one embodiment.

As mentioned above, the one or more servers 20 further execute the graph processor 22, which also analyzes the graph 15 to identify communities 23 that exhibit anomalous behaviors, as further described beginning with reference to FIG. 2. While in one embodiment the communities 23 may be a priori known, in a further embodiment, the communities 23 have to be discovered by the graph processor 22, such as using greedy agglomerative techniques described below with reference to FIG. 4. Each of the communities 23 is a group of two or more vertices connected by one or more edges and can be identified by the graph processor 22 as described below with reference to FIGS. 2 and 4. Each of the vertices in the graph 15 can belong to only a single community 23 and all of the vertices in the graph 15 belong to one of the communities 23. Thus, each of the communities 23 represents a group of two or more vertices that are connected by one or more events associated with the entities. For example, in the health care example, each community 23 can represent at least one healthcare provider that made prescriptions to one or more particular pharmacies. Vertices representing multiple healthcare providers with distinct specialties can be part of the same community 23.

As further described with beginning with reference to FIG. 2, the graph processor 22 can analyze the words associated with vertices in each of the communities 23 and calculate a score 24 representing the likelihood of those words being associated with the community, with the topics 19 that the vertices that the community is associated with being used in the calculation of the likelihood. Thus, in the healthcare example, the score 24 represents the likelihood that a healthcare provider that treats particular kinds of patients would have made prescriptions for the types of drugs prescribed to pharmacies in the community 23. While the description above references multiple communities 23, in a further embodiment, all vertices in a graph 15 could be a part of a single community 23.

Figure 5A:
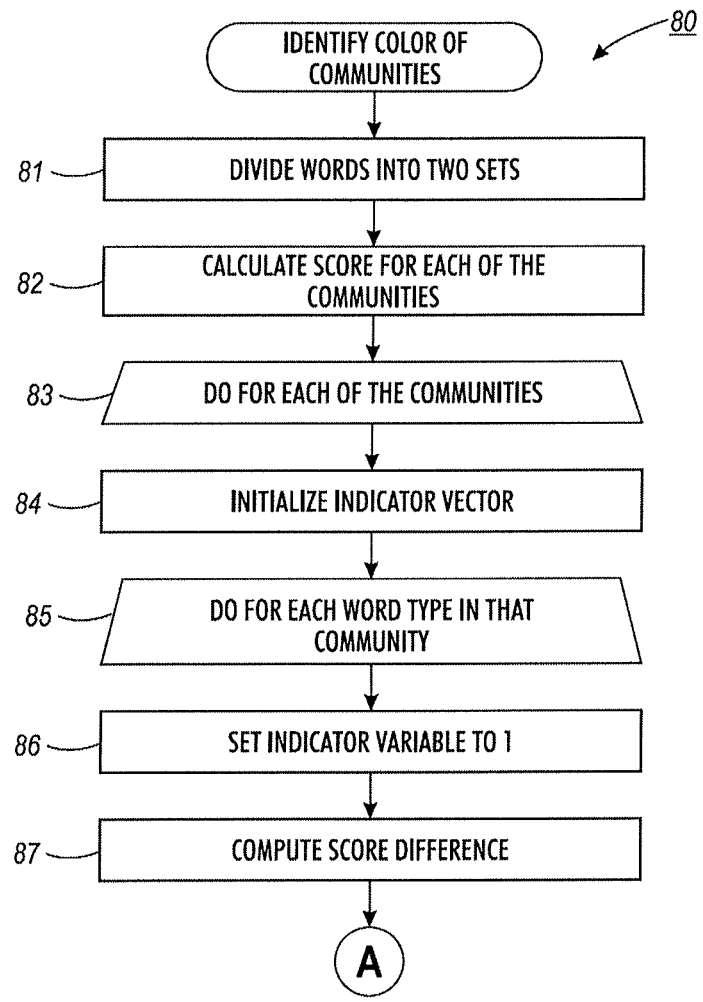
FIGS. 5A and 5B are flow diagrams showing a routine for calculating colors of communities for use in the method of FIG. 2 and routine of FIG. 4 in accordance with one embodiment.
Figure 5B:
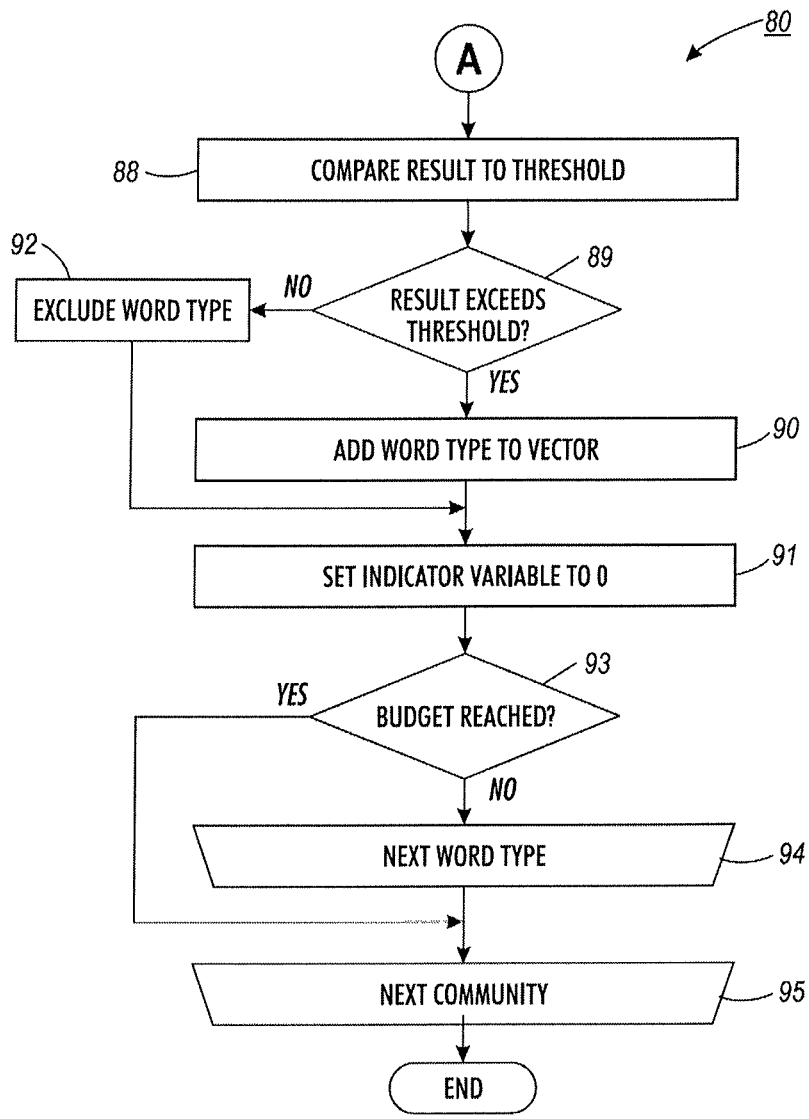

The graph processor 22 uses the scores 24, as further described with reference to FIGS. 5A and 5B, to identify word categories that are anomalous for the communities 24: word types which are not likely to be in a community 23 based on the topics 19 that the vertices in the community 23 are associated with. To identify the word categories, the graph processor 22 calculates the likelihood of the collections 17 of edge words being in the community if a particular type of word was removed from the collection 17 (referred to as a "modified score" in the description below). The modified score for a community is compared to the score 24 for the community 23, and if the difference between the score 24 and the modified score for the community exceeds a particular threshold, the word category is identified as anomalous for that community 23. In the description below, the set of all of the word types that are anomalous for a community 23 are referred to as the "color" 25 of that community, though other terms can also be used for the set. This set can be stored in a sparse indicator vector, as further described below with reference to FIGS. 5A and 5B, though other ways to store the color 25 of the community 23 are possible. The word categories identified as anomalous for the community 23 are anomalous for all of the vertices in the community 23: the anomaly is shared for the community members. Thus, in the healthcare example, if a certain type of drugs is identified as anomalous for a community 23, the type of drugs is anomalous for all healthcare providers and pharmacies represented by the community 23.

Once obtained, the communities 23, the scores 24 for the communities 23, the colors 25 of those communities 25, and other processing results, such as the modified scores, can be stored in the database 11.

The colors 25 of the communities 23 and other results of the processing by the one or more servers 20 can be output by the one or more servers 20 in a number of ways. For example, the graph processor 22 can output the color 25 and other results via a network 26, which can be an Internetwork such as the Internet or an intranetwork, to at least one user device 27, such as a desktop computer, a laptop, a smart phone, or a tablet, though other examples of user devices 27 are possible. The communities 23 and their colors can be presented as a graph, such as described below with reference to FIG. 6, though other ways to show the data are possible. Other ways to output the results are possible. The colors 25 and other results can be presented on the user device in ways such as via an Internet browser and a specialized application communicating with the one or more servers 20, though other ways to present the colors and other communities 25 are possible.

The one or more servers 20 and the user device 27 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the servers can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the computations and communication described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the one or more servers 20 and the user device 27 can include other components found in programmable computing devices, such as input/output ports, network interfaces, and non-volatile storage, although other components are possible. Also, the one or more servers 20 can be dedicated servers or be servers in a cloud-computing environment.

Identifying topics 19 associated with community vertices and analyzing the words associated with the vertices in light of the topics allows to effectively identify communities that exhibit anomalous behavior. FIG. 2 is a flow diagram showing a computer-implemented method 30 for discovering heterogeneous communities with anomalous components in accordance with one embodiment. The method 30 can be implemented on the system 10 of FIG. 1, though other ways to implement the method are possible. The data 12 associated with the entities is maintained in the database 11 (step 31). Optionally, the data 12 is preprocessed to make the data 12 suitable for further analysis (step 32). For example, the reimbursed sales in the count vectors 18 associated with each type of words, such as each categories of drugs, can be rounded down to the nearest dollar as reimbursed sales amounts are generally continuous. Further, specific categories of words that are common across all topics 19 are identified, compiled into a list, and removed from the documents 14. For example, drug categories prescribed by providers treating all kinds of patients can be identified; as these categories not indicative of provider behavior are compiled into a list and removed from the documents 14. For instance, Acetaminophen is prescribed by almost all practitioners and counts of Acetaminophen poorly differentiate between providers, and thus can be removed from further processing. Other kinds of preprocessing are possible.

If not previously available, the graph 15 is constructed by the servers 20 based on the data 12 in the database 11 (step 33), using techniques such as described above with reference to FIG. 1. A complete likelihood of all of the words associated with all of the vertices in the graph 15 are determined, as further described with reference to FIG. 3 (step 34). Also, if not previously available, communities 23 are identified in the graph 15, as further described with reference to FIG. 4 (step 35). The color 25 of each of the communities 23 is determined using the complete likelihood calculation (step 36), as further described below with reference to FIG. 5, and the determined colors 25 are output (step 37), as further described with reference to FIG. 6, ending the method 30.

Figure 3:
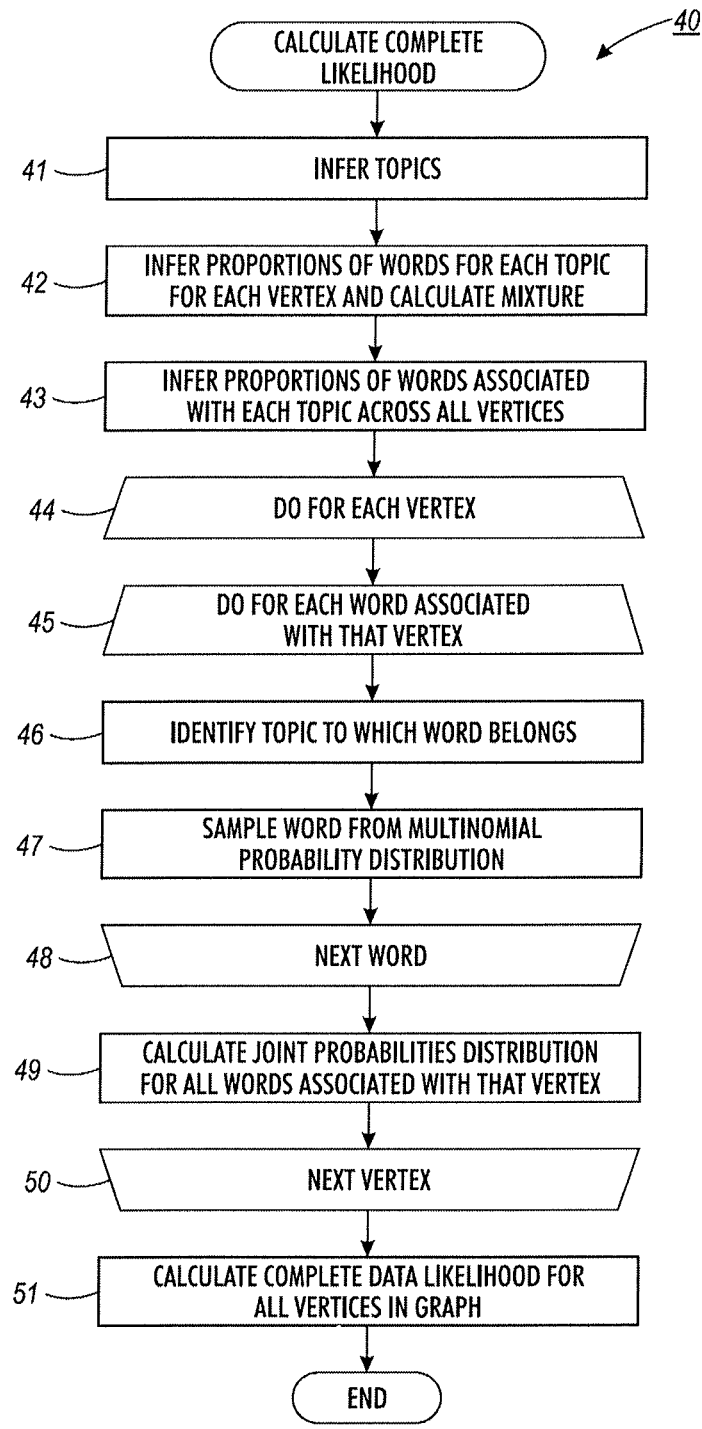
FIG. 3 is a flow diagram showing a subroutine for calculating a complete likelihood for all words associated with all vertices in a graph for use in the routine method of FIG. 2 in accordance with one embodiment.

Discovering the topics 19 associated with the entities allows to identify normal behavior patterns of the entities represented by the vertices. FIG. 3 is a flow diagram showing a routine 40 for calculating a complete likelihood for all words associated with all vertices in a graph 15 for use in the method 30 of FIG. 2 in accordance with one embodiment. Initially, the topics 19 that are associated with each of the vertices in the graph 15 are inferred from the documents 14 associated with that vertex (step 41). The inference can be performed as described in "Latent Dirichlet Allocation," Blei et al., Journal of Machine Learning Research 3, 993-1022 (2003) ("Blei et al."), the disclosure of which is incorporated by reference. Other ways to perform the inference are also possible. For each of the topics associated with a particular vertex, the proportion of words associated with each vertex in the collection that is associated with that topic is identified and the mixture of the proportions is calculated (step 42). The inference can be performed using techniques such as those described in Blei et al., though other ways to perform the inference of the proportions are possible. In the following description, the proportion of the words is identified as $\alpha$. The letter $\pi$ is used to identify the mixture of the proportions for the vertex, with being sampled from $\pi$~Dirichlet($\alpha$). Also, is inferred from the documents 14 a proportion of each of the words among the words associated with each of the topics across all of the vertices, such as using techniques described by Blei et al., though other ways to perform the inference are possible (step 43). The proportion inferred in step 63 is denoted as $\beta$. As mentioned above, each of the topics 19 is a word proportion vector and $\beta$ for the vector describes the word proportions of the vector.

Once the $\alpha$, $\pi$, and $\beta$ are identified, an iterative processing loop (steps 44-50) is performed for each of the vertices in the graph 15 (step 44). Inside the loop (steps 44-50), an additional processing loop (steps 45-48) is started for each of the words, $w_v$, associated with each of the vertices (step 45). First, the index of the topic 19 to which the word belongs is identified, denoted as $z_n$ (step 46). The topic index $z_n$ is sampled from a multinomial distribution, $z_n$~Multinomial ($\pi$), and the word $w_{vn}$ is sampled from a multinomial probability distribution $P(w_n|z_n,\beta)$ (step 47) for topic $\beta$. The loop 45-48 moves to the next word for that vertex (step 48). Once the probability distribution is calculated for all of the words in a collection for the vertex, a joint probability distribution for all words for that vertex is calculated according to the equation (step 49):

$$P(w_v|\alpha,\beta) = \int P(\pi|\alpha)(\Pi_n \Sigma_{z_n} P(z_n|\pi) P(w_n|z_n,\beta)) d\pi,$$

In calculating the joint probability distribution certain assumptions are made: that $\Sigma_{p=1}^{P} \pi_p = 1$ and that the number of topics is fixed and known. Given the topic proportions a topic assignment $z_n$ is sampled for each word in the document. The assignment indicates which topic generated the word. Given a topic assignment words are sampled from a multinomial distribution with parameters $\beta_{z_n}$.

Once the joint probability distribution for all of the words is calculated, the loop (steps 44-50) moves to the next vertex (step 50). Once the joint probability distribution for all of the vertices is calculated, the complete data likelihood is generated for all of the words for all of the vertices in the graph 15 is obtained, in accordance with the equation (step 51):

$$P(D|\alpha,\beta) = \Pi_v \int P(\pi_v|\alpha)(\Pi_n \Sigma_{z_{vn}} P(z_{vn}|\pi_v) P(w_{vn}|z_{vn},\beta)) d\pi,$$

ending the routine 40. The complete data likelihood obtained in step 51 is used to obtain the color of each community, as further described below with reference to FIGS. 5A and 5B.

Figure 4:
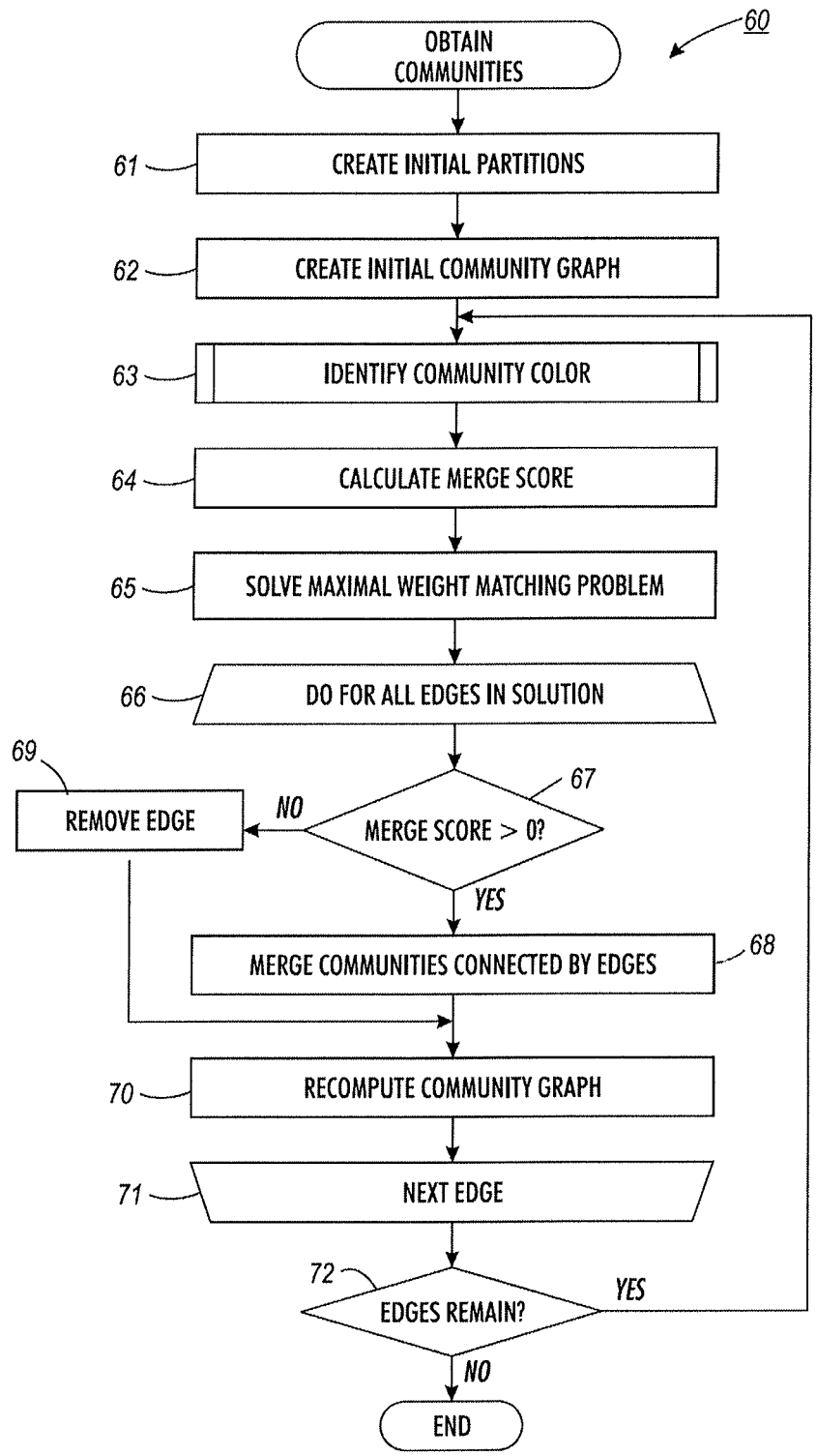
FIG. 4 is a flow diagram showing a routine for obtaining communities for use in the method of FIG. 2 in accordance with one embodiment.

Discovering communities 23 in graph 15 allows the communities 23 to be analyzed for anomalous behavior. FIG. 4 is a flow diagram showing routine 60 for obtaining communities 23 for use in the method 30 of FIG. 2 in accordance with one embodiment. An initial partitioning of the graph 15, denoted as G for the routine 60, is created (step 61). In one embodiment, the initial partitioning results in each vertex being a separate partition. In a further embodiment, the initial partitions may have a differing number of vertices. An initial community graph is created based on the initial partitions and the graph G (step 62). The initial community graph $G_c=(V_c, E_c)$ is defined such that each initial community in $c \in V_c$ is a connected component of the original graph G, and there exists an edge between communities $c_i$ and $c_j$ if there exists $v \in c_i$ and $q \in c_j$:$e(v,q) \in E$. Thus, each of the initial partitions becomes an initial community. If not previously available, a color of each of the initial communities in the community graph is identified, as further described with reference to FIG. 5 (step 63). Further, as part of step 63, for each of the initial communities connected by an edge, a color of the community that would be created by merging the two connected communities is also identified (step 63).

For each of the edges in the initial community graph, the edges denoted as e, once the initial community graph is created and the colors are identified, a merge score is calculated for merging the initial communities connected by that edge (step 64). Given a pair of connected initial communities the merge score is defined for these communities to be, $$ms(e)=P(e=(c_i,c_j)|\alpha,\beta,\phi_c)-P(c_i|\alpha,\beta,\phi_{c_i})-P(c_j|\alpha,\beta,\phi_{c_j}).$$

The merge score measures the improvement in the likelihood for having merged communities $c_i$ and $c_j$ into the community c. In the above equation, $\phi_c$ represents the color of the merged community, and, $\phi_{c_i}$ and $\phi_{c_j}$ the color of the initial communities. $P(e=(c_i,c_j)|\alpha,\beta,\phi_c)$ is the likelihood of the collections 17 of edge words being in the merged community if the one or more types of words identified as part of the color of the merged community were removed from the collections 17. Similarly, $P(c_i|\alpha,\beta,\phi_{c_i})$ is the likelihood of the collections 17 of edge words being in the initial community $c_i$ if the one or more types of words identified as part of the color of the community $c_i$ were removed from the collections 17. Similarly, $P(c_j|\alpha,\beta,\phi_{c_j})$ is the likelihood of the collections 17 of edge words being in the initial community $c_j$ if the one or more types of words identified as part of the color of the community $c_j$ were removed from the collections 17. The likelihoods can be calculated according to the formula set down with reference to description of step 82 below. For each edge in $E_c$, the merge score for the associated initial communities is recorded. Once all of the scores are calculated, the Maximal Weight Matching problem is solved for the initial community graph (step 65). A matching for a graph $G_c$ is a set of edges such that no two edges share a common vertex. A maximal matching is a matching that maximizes the sum of edge scores. Efficient solutions to the matching problem run in time $O(V^{2.376})$ and approximate solutions can be provided in time $O(E_c)$.

All of the edges in the solutions are subsequently processed in an iterative processing loop of steps 66-71 (step 66). If the merge score for the edge is greater than zero (step 67), the initial communities connected by the graph are merged together (step 68). If the merge score is not greater than zero, the edge is removed from the community graph and not analyzed again during further iterations of the loop 66-71 (step 69). The community graph is recomputed based on the merged communities and the removed edges (step 70) and the processing loop of steps 65-71 moves to the next edge (step 71). Once all of the edges are processed through the loop (steps 66-71), if some of the edges have not been removed in step 69 and remain for further processing (step 72), the routine 60 returns to step 63, with the merged communities and the recomputed graph being treated as the initial communities and the initial community graph respectively during further iterations of the processing per steps 63-72. If no more edges remain, the routine 60 ends. Through multiple iterations of the steps 63-72, the vertices are joined into larger communities.

Determining the color of each community allows to effectively visualize the communities that exhibit anomalous behavior. As mentioned above, the color of the community is a subset of word types, represented by a sparse indicator vector, identifying the communities' anomalous behavior, such as anomalous drug sales. FIGS. 5A and 5B are flow diagrams showing a routine 80 for calculating colors of the communities for use in the method 30 of FIG. 2 and routine 60 of FIG. 4 in accordance with one embodiment. The routine 80 can be used for identifying a color of the communities created during the execution of the routine 60, the initial communities and the recomputed communities, or for determining the color 24 of the final identified communities 23. Initially, for each of the vertices in each of the communities, the words associated the vertices are divided into two sets: words associated with edges that connect the vertex to members of the same community ("internal words") and words associated with edges that connect the vertex to vertices outside of the community ("outgoing words") (step 81). Thus, the set of the internal words represents prescriptions made to members of the same community and the set of outgoing words represents prescriptions made outside the community. The set of the internal words includes $w_{i,in} = \cup \ w_{e_{ij}}: v \neq j \wedge v_j \in c \wedge v_i \in c$ and the set of the external words includes $w_{i,out} = \cup \ w_{e_{ij}}: v \neq j \wedge v_j \notin c \wedge v_i \in c$.

The two sets of words and the community likelihood data calculated in step 51 above are used to obtain the score for each of the communities in accordance with the equation (step 82):

$$P(c \mid \alpha, \beta) = \prod_{[v \in c]} \int P(\pi_v \mid \alpha) \left( \prod_{w_{v,out}} \sum_{z_{v,out}} P(z_{v,out} \mid \pi_v) P(w_{v,out} \mid z_{v,out}, \beta) \right)$$
$$\left( \prod_{k=1}^{K} \prod_{n=1}^{N_{v,k} - \phi_{c,k} N_{v,k}} \sum_{z_{v,in}} P(z_{v,k,n,in} \mid \pi_v) P(w_{v,k,n,in} \mid z_{v,k,n,in}, \beta) \right),$$

where $P(c|\alpha,\beta)$ is the score, $\phi_{c,k}$ is an indicator variable, and $N_{v,k}$ the count of the internal words. In one embodiment, the value of $\phi_{c,k}$ can be 0 and 1. In a further embodiment, other values of $\phi_{c,k}$ are also possible. Here $N_{v,k}$ refers to the number of times word type k was traded by provider v to members of the provider's community.

Once the score for each of the communities is calculated, an iterative processing loop (steps 83-95) is performed for each of the communities (step 83). An indicator vector, a vector for storage of word types whose use is anomalous for the community, is initialized and set to be a vector of zeros (step 84). Within the loop started in step 83, another iterative processing loop (steps 85-94) is performed for each word type in the community (step 85). The indicator variable for that word type, $\phi_{c,v}$, is set to be $1: \phi_{c,v}=1$ (step 86). The difference of $P(C|\alpha,\beta,\phi_c)-P(C|\alpha,\beta)$ is calculated (step 87). As mentioned above, $P(C|\alpha,\beta)$, whose calculation is described with above with reference to step 82, is the score 25 when all word types associated with the community are taken into account. $P(C|\alpha,\beta,\phi_c)$ is a modified score calculated according to the formula given above with reference to step 82, where $\phi_{c,k}=\phi_{c,v}=1$; thus, the word type being processed is not taken into account in the calculation of the score $P(C|\alpha,\beta,\phi_c)$. The difference between the scores in step 87 is compared to a threshold (step 88), which can be set empirically, such as based on the number of vectors in the graph 15. For the example, the higher the number of vertices is in the graph, the higher is the threshold. If the result of the calculation exceeds the threshold (step 89), the word type is added to the indicator vector $\phi_c$ for that community, being stored as the word type that is anomalous for that community in the indicator vector (step 90). If the result of the calculation does not exceed the threshold (step 89), the word type is excluded from the vector $\phi_c$ (step 91). Following either step 90 and 91, $\phi_{c,v}$ is set to 0, which initializes the indicator vector and makes the vector ready to record other anomalous word types (step 92). If the indicator budget, the number of types that the vector $\phi_c$ can store, has not been reached (step 93), the iterative processing loop moves (steps 85-94) to the next word type (step 94). If the indicator budget 93 has been reached for that community, the processing loop moves 83-95 to the next community (step 95). Once all of the communities have been processed through the processing loop of steps 83-95, the subroutine 80 ends.

Figure 6:
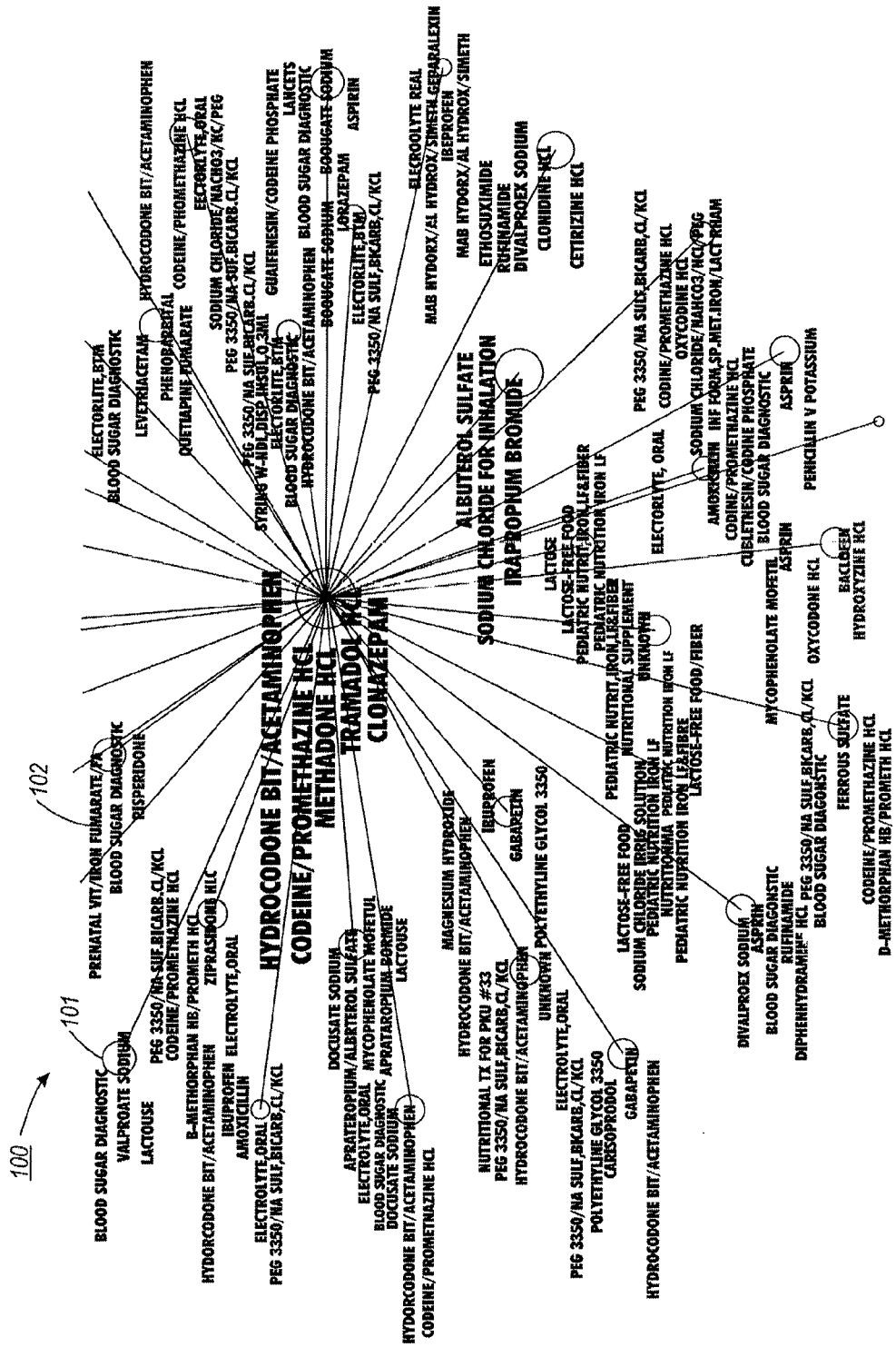
FIG. 6 is a diagram showing, by way of example, a visualization of discovered communities with anomalous behavior.

Once found, the communities exhibiting anomalous behavior and their word types whose use is anomalous can be visualized to allow effective identification of the communities with anomalous behavior for an analyst working with the anomalous data. FIG. 6 is a diagram 100 showing, by way of example, a visualization of discovered communities with anomalous behavior. In the visualization, each node (represented by a circle, an example of which is marked with numeral 101) represents one of the discovered communities. The size of the node 101 represents the degree of anomalousness, with the degree of anomalousness being determined by the difference in the scores determined in step 87 above. The larger each node is, the greater is the degree of the anomalousness for the community represented by the node. The anomalous word types (an example of which is marked with numeral 102) are displayed next to the node 101 representing the community 23; in the diagram, the five most anomalous word types (the categories for which the difference between the score 24 and the modified score are the greatest) for the community are shown, though a different number could be shown in a further embodiment. The size of the font with which the word types associated with the same node are shown relative to each other depends on the degree the word type is responsible for the anomalousness of that community (i.e. the amount by which the score for the community changes once the word type is removed), with the word types responsible for a greater share of anomalousness being displayed with a larger font. Further, the word types associated with different communities can be displayed with fonts of different sizes, with the size of the font correlating with the size of the associated node. Thus, the font size associated with the larger nodes can be larger than the font size of a word type associated with a smaller node. In a further embodiment, the size of the word types can be independent of the size of the nodes. While the word types and the nodes can be represented in certain colors and shades of colors, such as shown in the diagram 100 of FIG. 6, different colors and shades of colors for the word types and the nodes are possible. In a further embodiment, the word types and the diagrams can all be represented using the same color. In a still further embodiment, information about each of the edges can be also represented in the diagram 100 and allow an analyst to quickly identify specific sales made within the community, which could be used to verify the illicit nature of the activities.

The diagram 100 was created by applying the method 30 described above to a prescription network composed of more than 76000 medical providers and the pharmacies with which they communicate. In order to characterize provider behavior, the set of prescribed drugs was decomposed by their HICL number. This particular categorization of drugs facilitates intuitive examination of medical provider behavior by medical fraud analysts. The resulting decomposition of the prescribed drugs yields 1501 categories of pharmaceuticals ranging from baby formula to powerful narcotics such as Morphine Sulfate. At the center of the diagram 100, there is a particularly anomalous community, and this community stands out because of the narcotics sales happening in the community. A depiction of this kind provides instantaneous feedback to analysts that can direct attention to the right provider communities and help analysts determine which details to focus on within a given community.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for discovering heterogeneous communities with shared anomalous components, comprising:
   at least one hardware processor configured to:
      obtain a graph comprising a plurality of vertices, each of the vertices representing an entity and being connected to at least one of the remaining vertices by an edge representing one or more events associated with the entities represented by the connected vertices, each of the vertices associated with a collection of words of one or more categories, each of the words describing an item associated with at least one of the events associated with that vertex, each of the vertices further associated with one or more one topics each of which describes a type of an activity of the entity represented by that vertex;
      identify one or more communities within the graph, each of the communities comprising at least two of the connected vertices;
      for at least one of the communities, identify one or more of the categories of the words whose removal from the collections associated with the vertices in that community increases a likelihood of that community being associated with the collections of the words associated with the vertices in that community; and
      set one or more of the identified word categories as anomalous for that community for which the word categories were identified, wherein an action is taken to stop a criminal activity associated with that community based on the one or more anomalous word categories set for that community.

2. The system according to claim 1, further comprising:
   a database interfaced to the at least one processor and comprising a plurality of documents regarding the vertices and the edges, each of the documents associated with one or more of the vertices, wherein the at least one processor is further configured to:
      create the graph based on the data;
      infer from the documents the topics associated with each of the vertices and proportions of the words in the collection associated with that vertex that are associated with each of the topics;

infer from the documents proportions of the words associated with each of the topics among all of the vertices;

sample each of the words from a multinomial probability distribution using the proportion of the words associated with each of the topics;

calculate a joint distribution for the collection of the words for each of the vertices based on the multinomial distribution for the words for that vertex; and use the joint distribution to identify the one or more of the anomalous types of words for each of the communities.

3. The system according to claim 2, wherein the at least one processor is further configured to:

identify those of the categories of the words that are associated with multiple topics; and remove at least some of the words associated with at least one of the identified categories from the collections prior to inferring the topics.

4. The system according to claim 1, wherein the at least one processor is further configured to:

calculate a likelihood of that community being associated with the words of all of the categories in the collections associated with the vertices in that community;

for each of the word categories associated with that community, calculate a modified score comprising a likelihood of that community being associated with the collections associated with the vertices in that community when those collections exclude the words of that category;

subtract the score from the modified score and comparing a result of the subtraction to a threshold;

compare the result of the subtraction to a threshold for each of the word types; and set those of the word types where the result exceeds the threshold as the word types to be removed.

5. The system according to claim 4, wherein each of the edges is associated with a portion of the words in the collection associated with the vertex and wherein the at least one processor is further configured to:

divide the words for each of the communities into a set of the words that are associated with edges between the vertices of that community and a set of the words associated with the edges that are between one of the vertices of the community and one of the vertex outside of that community; and use the sets of the words to calculate the score and the modified score.

6. The system according to claim 1, wherein the at least one processor is further configured to:

partition the graph into a plurality of nodes and create a community graph comprising a set of initial communities based on the partition, each of the initial communities comprising at least one of the vertices;

calculate a merge score for each pair of the initial communities connected by at least one of the edges in the solution;

find a solution for the maximal weight matching problem for the graph, the solution comprising one or more of the edges of the graph;

merge those of the initial communities which are connected by the edges in the solution and whose merge scores are greater than zero;

discard those of the edges that are comprised in the solution whose merge score is not greater than zero; and recompute the community graph based on the merged initial communities, wherein the communities are comprised in the recomputed graph and comprise the merged initial communities.

7. The system according to claim 1, wherein each of the entities represents at least one of a healthcare provider and a pharmacy, each of the edges represents a prescription event involving one of the providers and of the pharmacies, represents a drug prescribed in the prescription event, each of the categories represents a class of the drugs, and the type of the activity represents a type of a patient dealt with by the entity associated with the activity.

8. The system according to claim 1, wherein the at least one processor is further configured to:

graphically depict each of the communities as a node, wherein the communities with a greater number of words of the anomalous word types are represented as larger nodes than the nodes representing those of the communities with a smaller number of the words of the anomalous word types.

9. The system according to claim 8, wherein the at least one processor is further configured to:

display the anomalous word categories proximately to the depicted nodes representing the communities for which the word categories are anomalous, wherein the size of the displayed categories depends on the size of the associated node.

10. The system according to claim 9, wherein at least one of the size and a color of the displayed categories depends on the increase of the likelihood.

11. A computer-implemented method for discovering heterogeneous communities with shared anomalous components, comprising:

obtaining a graph comprising a plurality of vertices, each of the vertices representing an entity and being connected to at least one of the remaining vertices by an edge representing one or more events associated with the entities represented by the connected vertices, each of the vertices associated with a collection of words of one or more categories, each of the words describing an item associated with at least one of the events associated with that vertex, each of the vertices further associated with one or more one topics each of which describes a type of an activity of the entity represented by that vertex;

identifying one or more communities within the graph, each of the communities comprising at least two of the connected vertices;

for at least one of the communities, identifying one or more of the categories of the words whose removal from the collections associated with the vertices in that community increases a likelihood of that community being associated with the collections of the words associated with the vertices in that community; and setting one or more of the identified word categories as anomalous for that community for which the word categories were identified, wherein the steps are implemented by a suitably-programmed computer and wherein an action is taken to stop a criminal activity associated with that community based on the one or more anomalous word categories set for that community.

12. The method according to claim 11, further comprising:

maintaining in a database a plurality of documents regarding the vertices and the edges, each of the documents associated with one or more of the vertices;

creating the graph based on the data;
inferring from the documents the topics associated with each of the vertices and proportions of the words in the collection associated with that vertex that are associated with each of the topics;
inferring from the documents proportions of the words associated with each of the topics among all of the vertices;
sampling each of the words from a multinomial probability distribution using the proportion of the words associated with each of the topics;
calculating a joint distribution for the collection of the words for each of the vertices based on the multinomial distribution for the words for that vertex; and
using the joint distribution to identify the one or more of the anomalous types of words for each of the communities.

13. The method according to claim 12, further comprising:
identifying those of the categories of the words that are associated with multiple topics; and
removing at least some of the words associated with at least one of the identified categories from the collections prior to inferring the topics.

14. The method according to claim 11, further comprising:
calculating a likelihood of that community being associated with the words of all of the categories in the collections associated with the vertices in that community;
for each of the word categories associated with that community, calculating a modified score comprising a likelihood of that community being associated with the collections associated with the vertices in that community when those collections exclude the words of that category;
subtracting the score from the modified score and comparing a result of the subtraction to a threshold;
comparing the result of the subtraction to a threshold for each of the word types; and
setting those of the word types where the result exceeds the threshold as the word types to be removed.

15. The method according to claim 14, wherein each of the edges is associated with a portion of the words in the collection associated with the vertex, further comprising:
dividing the words for each of the communities into a set of the words that are associated with edges between the vertices of that community and a set of the words associated with the edges that are between one of the vertices of the community and one of the vertex outside of that community; and
using the sets of the words to calculate the score and the modified score.

16. The method according to claim 11, further comprising:
partitioning the graph into a plurality of nodes and creating a community graph comprising a set of initial communities based on the partition, each of the initial communities comprising at least one of the vertices;
calculating a merge score for each pair of the initial communities connected by at least one of the edges in the solution;
finding a solution for the maximal weight matching problem for the graph, the solution comprising one or more of the edges of the graph;
merging those of the initial communities which are connected by the edges in the solution and whose merge scores are greater than zero;
discarding those of the edges that are comprised in the solution whose merge score is not greater than zero; and
re-computing the community graph based on the merged initial communities, wherein the communities are comprised in the recomputed graph and comprise the merged initial communities.

17. The method according to claim 11, wherein each of the entities represents at least one of a healthcare provider and a pharmacy, each of the edges represents a prescription event involving one of the providers and of the pharmacies, represents a drug prescribed in the prescription event, each of the categories represents a class of the drugs, and the type of the activity represents a type of a patient dealt with by the entity associated with the activity.

18. The method according to claim 11, further comprising:
graphically depicting each of the communities as a node, wherein the communities with a greater number of words of the anomalous word types are represented as larger nodes than the nodes representing those of the communities with a smaller number of the words of the anomalous word types.

19. The method according to claim 18, further comprising:
displaying the anomalous word categories proximately to the depicted nodes representing the communities for which the word categories are anomalous, wherein the size of the displayed categories depends on the size of the associated node.

20. The method according to claim 19, wherein the wherein at least one of the size and a color of the displayed categories depends on the increase of the likelihood.

* * * * *